United States Patent [19]
Leistiko

[11] 4,451,989
[45] Jun. 5, 1984

[54] BOAT KEEL TOOL

[76] Inventor: Lawrence F. Leistiko, 10210 Queen Ave. S., Bloomington, Minn. 55431

[21] Appl. No.: 485,236

[22] Filed: Apr. 14, 1983

[51] Int. Cl.³ ............................................. G01C 15/00
[52] U.S. Cl. ...................................... 33/286; 33/263; 33/180 R; 33/174 R
[58] Field of Search .................... 33/286, 180 R, 227, 33/262, 263, 264, 274, 285, 174 R; 114/140, 141

[56] References Cited
U.S. PATENT DOCUMENTS

| | | | |
|---|---|---|---|
| 2,364,064 | 12/1944 | Francesco | 33/286 |
| 2,737,722 | 3/1956 | Keim | 33/286 |
| 2,814,125 | 11/1957 | Hartwig | 33/286 |
| 3,389,911 | 6/1968 | Castiglione, Jr. | 33/263 |

*Primary Examiner*—Willis Little

[57] ABSTRACT

A boat keel tool which is designed to check the alignment of a keel with the center line of a boat and simultaneously measure and check the cross sectional surface of a boat keel from the lead edge of the keel to the trailing edge of the keel.

3 Claims, 9 Drawing Figures

BOAT KEEL TOOL

In the boating industry, especially the sailboat industry, there is a constant attention directed to the manufacture of boats having keels and rudders perfectly aligned with the center line of the sailboat. Sailboats, and especially those designed for racing, are manufactured and maintained with mathematical precision.

The proper performance of a sailboat is dramatically affected by several mechanical features of the keel and rudder of such a boat. First, the keel must be designed to have a particular shape which is compatible with the other characteristics of the boat. For instance, great attention is directed at designing keels that are of the proper length, depth, thickness and shape in order to achieve certain performance characteristics for the boat to which the keel is attached. This is also true of the rudder although to a somewhat lesser extent. These various shapes, sizes and alignments of the keel are necessary in order to permit the design of a boat which functions differently in different weather, water and load conditions. The design of the keel is only the first step in achieving the proper operational characteristics for the boat.

A further problem is encountered by manufacturers and owners of boats in the placement of the keel in the proper place on the boat hull with proper alignment. Alignment is of great importance on a sailboat since the keel is instrumental in how closely to the normal direction the boat can sail and how the boat responds to the rudder. An improperly aligned keel, that is a keel which has a center line misaligned with respect to the center line of the boat, will steer and react to the wind differently on one tack than it will on the other. Misalignment of the keel will cause the boat to be much slower on one tack than another because of the need to overcompensate with the rudder in order insure that the boat is pointed in the direction desired with respect to the wind. Misalignment of the center line of the keel with respect to the center line of a boat also will cause undesirable turbulence at the trailing edge of the keel and thus interfere dramatically with the speed and other performance characteristics of the boat.

Another very important feature of a keel is symmetry. A properly manufactured keel should be totally symmetrical in its cross section at all points. If this symmetry is not achieved, then the boat will steer and sail differently on one tack than it will on the other. Since the keel is nothing more than a hydrodynamic surface, the water will flow over the keel differently on different tacks unless the cross sectional shape of the keel is exactly symmetrical. Achieving this symmetry is difficult in the mass production of boats and, accordingly, is a constant source of poor quality in the manufacture of high quality sailboats.

A keel also is mathematically designed so that it has the proper taper from its connection to the boat to the bottom of the keel deepest in the water. This taper from the boat connection to the bottom of the keel is designed for specific performance results. Maintaining a proper shape from the root of the keel to the bottom of the keel is therefore of importance in the function of a boat.

Another consideration in the manufacture of a keel is alignment of the keel not only at the root of the keel where it connects to the boat but also alignment along the length of the keel. It is possible for the keel center line to be properly aligned at the root of the keel but the keel may develop or have manufactured into it a screw-shape so that at various points along its length, the cross sectional center line of the keel are not parallel to the center line of the boat. This corkscrew shape can adversely affect the function of the keel and therefore needs to be identified for correction and proper alignment.

The industry and owners of sailboats have not been provided with simple tools which can adequately and inexpensively check the alignment, symmetry and taper of a keel so that corrections can be made to improve the operational characteristics of the boat.

SUMMARY OF THE INVENTION

It is accordingly an object of the present invention to provide a tool for measuring the alignment and symmetry of a boat keel.

Another object of the present invention is to provide a simple measuring tool for checking the symmetry of a keel and the alignment thereof with the center line of a boat by application of the tool to the keel of the boat.

It is a further object of the present invention to provide a boat keel tool having a sight mechanism adapted to check the alignment of the keel with the center line of the boat.

DESCRIPTION OF THE PREFERRED EMBODIMENT

Figure 3:
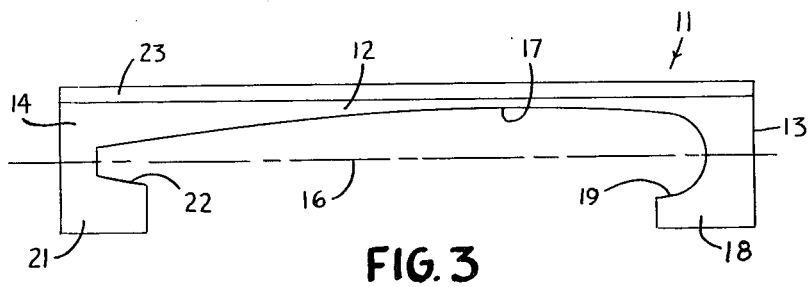
FIG. 3 is a top view of the tool according to the present invention.

Refer first to FIG. 3 of the drawings where a tool according to the present invention is shown in a top view. The tool generally designated by the numeral 11 has a body 12 with a leading end 13 and a trailing end 14. The length of the tool 11 is sufficiently long so that the entire tool along its longitudinal axes 16 is longer than the distance between the leading and trailing edge of a keel to which the tool will be applied.

Figure 4:
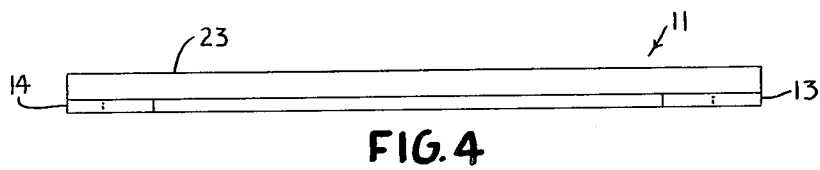
FIG. 4 is a front view of the tool.

The tool 11 is essentially planer in shape and this is demonstrated in FIG. 4 of the drawings where it is observed that the body 12 of the tool is relatively thin in comparison to its length and width. The tool 11 can be made from a variety of materials including aluminum, wood, stiff paperboard or similar materials. The importance of the material only comes into play and is dependent upon how many times the tool is designed to be used. A tool body 12 made from a relatively fragile material such as paper could possible only be used a few times. A tool made from sheet aluminum, however, would be useable for an extended period of time for making numerous measurements of a keel.

The keel 11 has a curved surface 17 which extends from the leading end 13 to the trailing end 14 thereof and is a curve which duplicates the desired shape of one half the cross section of a keel. The half cross section of the keel is outlined by the curve 17 and the longitudinal axes 16 of the tool 11.

The tool 11 also has a leading edge extension 18 at the leading edge of the tool 11 which contains a curve 19 which is a mirror image of the corresponding curve in the body 12 of the tool 11. Curve 19 and the corresponding section of curve 17 form a symmetrical curve duplicating the leading edge of a keel to which the tool 11 is to be applied for measurement.

Likewise, tool 11 has a trailing edge extension 21 at the trailing end 14 of tool 11 which contains a curve 22 which is a mirror image of the trailing end of curve 17 in the main body 12 of the tool. Curves 22 and 17 form a symmetrical curve for the trailing edge of a keel to be measured by tool 11. The tool 11 has an interrupted side opening formed by the space between extensions 18 and 21 so that the tool 11 can be easily applied to a tapered boat keel.

The keel also contains a flange 23 which is applied along the body of the tool 11 and is parallel to the longitudinal axes 16 of the tool 11. Flange 23 is parallel to longitudinal axes 16 so that the flange 23 can be used as a sighting device to check the alignment of a keel with the center line of a boat which will be described hereinafter.

Figure 6:
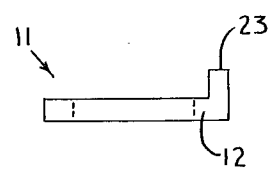
FIG. 6 is an end view of the tool shown in FIG. 3 of the drawings.

The flange 23 can be a simple flange as demonstrated in FIG. 6 of the drawings and in a preferred embodiment is at a 90° angle with respect to the body 12 of the tool 11. For sighting purposes, the flange 23 does not need to be perpendicular to body 12.

Figure 7:
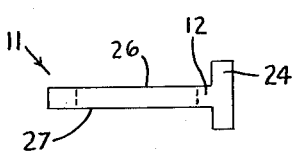
FIG. 7 is an alternate view embodiment of a cross section of the tool.

Another embodiment of the invention is illustrated in FIG. 7 of the drawings where tool 11 is shown with a T-style flange 24. In this embodiment the flange 24 is perpendicular to the plane of the body 12 and extends beyond the top surface 26 and the bottom surface 27 of the tool body 12.

Figure 5:
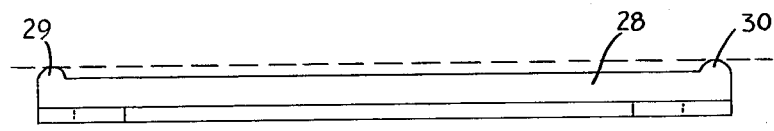
FIG. 5 is a front view of an alternate embodiment of the tool.

FIG. 5 of the drawings is an embodiment of the tool showing a flange 28 having sight extensions 29 and 30 at either end of the flange 28. These sight extensions 29 and 30 assist checking the alignment of the longitudinal axes 16 of the tool (cross section of the keel) with the center line of the boat. The flange 23 illustrated in FIGS. 3 and 4 of the drawings also perform this sighting function. The sight extensions 29 and 30 are sometimes useful to carry out this function but are not essential to the alignment process.

The first function of this multipurpose tool is illustrated by reference to FIGS. 1 and 2 of the drawings. The tool 11 is first applied to the keel 31 by placing it at a position lower on the keel where the keel 31 is more tapered and is therefore smaller in cross sectional area than the cross sectional area described by curve 17 of the tool 11. The tool 11 is then moved upward to a designated position on the keel 31 corresponding with predetermined positions 32, 33, 34, 36 and so forth. At these predetermined positions, the tool 11 has a curve 17 which outlines the ideal shape of the cross section of the keel 31 at a predetermined position such as position 33. Therefore, in the FIG. 1 of the drawings, tool 11 with the curve 17 ideally outlines the exact cross section of keel 31 at position 33. With tool 11 in position 33, the leading edge of the keel 37 should precisely fit into the symmetrical curve 19 (see FIG. 3 of the drawings) and curve 17 at the leading end 13 of the tool 11 and the trailing edge 38 of the keel 31 should fit within the curve formed at the trailing end 14 of tool 11 where the curve 22 forms a symmetrical curve of the trailing edge of the keel 38 with curve 17.

With the tool 11 now in place on the keel, an observer can determine whether the surface of the keel exactly lies along surface 17 of the tool. If there are any cavities or excess material along the cross section of the keel, the tool 11 will not fit in place at position 33 and will indicate any need to remove or add material along the keel surface. This will become apparent because curve surface 17 of the tool 11 will not precisely lay along the keel. The tool 11 through the use of curve 17 therefore indicates any imperfections in the shape of the keel which can now be corrected by addition or subtraction of material from the keel at that position 33.

Figure 2:
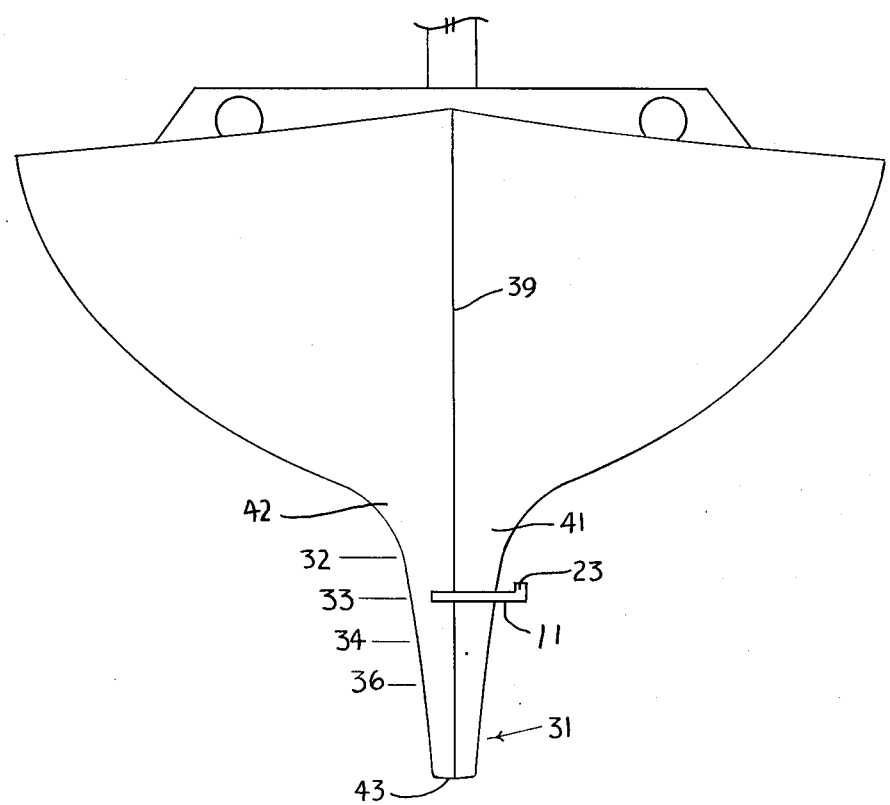
FIG. 2 is a front view of a boat showing application of the tool to the keel.

FIG. 2 of the drawings will illustrate that the tool 11 overlaps the keel 31 along the center line 39 which corresponds with the longitudinal axes 16 of the tool 11. Thus it can be seen that surface 41 of the keel 31 is measured at predetermined positions by the tool 11.

It will become apparent from this description that tool 11 contains an ideal cross sectional shape depicted by curve 17, curve 19 and curve 22 for the cross sectional size and shape of keel 31 at only one position along the keel due to the tapered nature of the keel and due to the fact that the keel has different cross sectional shapes along its length from the root of the keel where it is connected to the boat to the end or bottom of the keel 43. Additional tools 11 must be used for each position 32, 34, 36 and so forth along the length of the keel. Nevertheless, each tool 11 contains the same features. The only difference is the shape of the curves 17, 19 and 22 in the tool 11.

Figure 8:
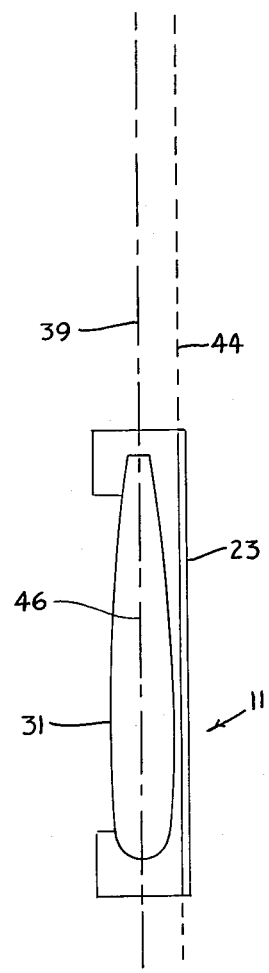
FIG. 8 is a top view of the tool applied to a keel and showing the keel in cross section and, FIG. 9 is a top view of the tool applied to a keel with the keel in cross section and out of alignment with the center line of a boat.
Figure 9:
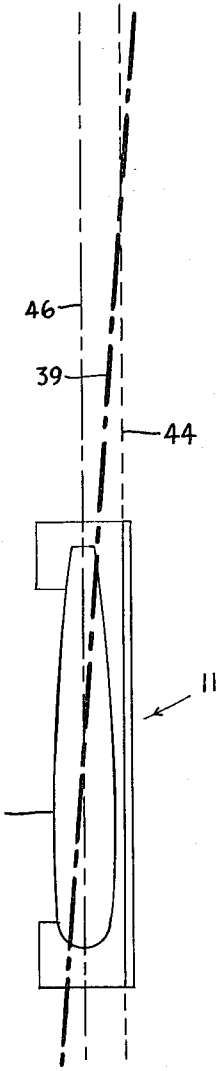

The alignment capability of the tool 11 can now be understood by reference to FIGS. 2, 8 and 9 of the drawings. Since the flange 23 lies parallel to the longitudinal axes of the tool 11 and since the longitudinal axes of the keel 31 also lies on the longitudinal axes 16 of the tool, this parallel relationship between the flange 23 and longitudinal axes 16 permits an operator of the tool to assess the alignment of the keel 31 with the center line 39 of the boat. By sighting along flange 23, the operator can determine whether the line of sight of the flange 23 will cross the imaginary extension of the line of the center line of the boat 39. If these lines, the center line of the boat 39 and the sight line 23 of the tool do not cross, and are parallel, then the keel 31 is properly aligned with the center line of the boat. This proper alignment of the center line of the boat and the center line of the cross section of the keel is depicted in FIG. 8 of the drawings where it is noted that the line of sight 44 taken along flange 23 is parallel to the center line 39 of the boat which in this case also coincides exactly with the center line 46 of the keel 31. Thus the tool 11 indicates in FIG. 8 that the keel 31 is properly aligned with the center line of the boat.

Reference to FIG. 9 of the drawings will reveal a misalignment of the keel 31 and the boat center line 39. In this case, the tool 11 has been applied to the keel 31 and it is noted that the sight line 44 of the tool 11 lies parallel to the longitudinal cross sectional axes 46 of the keel. However, this is out of alignment with the center line 39 of the boat. Thus it is noted that the line of sight 44 of the tool 11 will converge with the center line 39 of the boat. It is therefore obvious to the observer that the keel 31 does not have a longitudinal axes 46 which coincides with the center line 39 of the boat and realignment of the keel 31 is necessary in order to insure proper functioning of the keel and efficient steerage of the boat.

In the case where realignment is necessary, the keel 31 may need to be removed and realigned with the boat. On the other hand, another cause of misalignment may result from a twisting of the keel 31 along its length. For instance, the keel may be properly aligned at position 32 where it is attached at its root 42 to the boat. Measurement, however, by a similar tool at position 36 may reveal that at that position as viewed in FIG. 2 the keel is out of longitudinal alignment with the center line 39 of the boat. In this case it indicates to the operator of the tool that the keel 31 has a rotational twist in the keel and will need realignment only along a portion of its length.

Therefore it can be seen that the keel tool 11 can be used to not only check the alignment of the keel at one spot but also along its entire length. Further, it can check the alignment of the entire keel with respect to the center line of the boat. The curve of the ideal keel shape 17 placed in the tool determines any nonuniformity of the surface of the keel over which water must flow.

Figure 1:
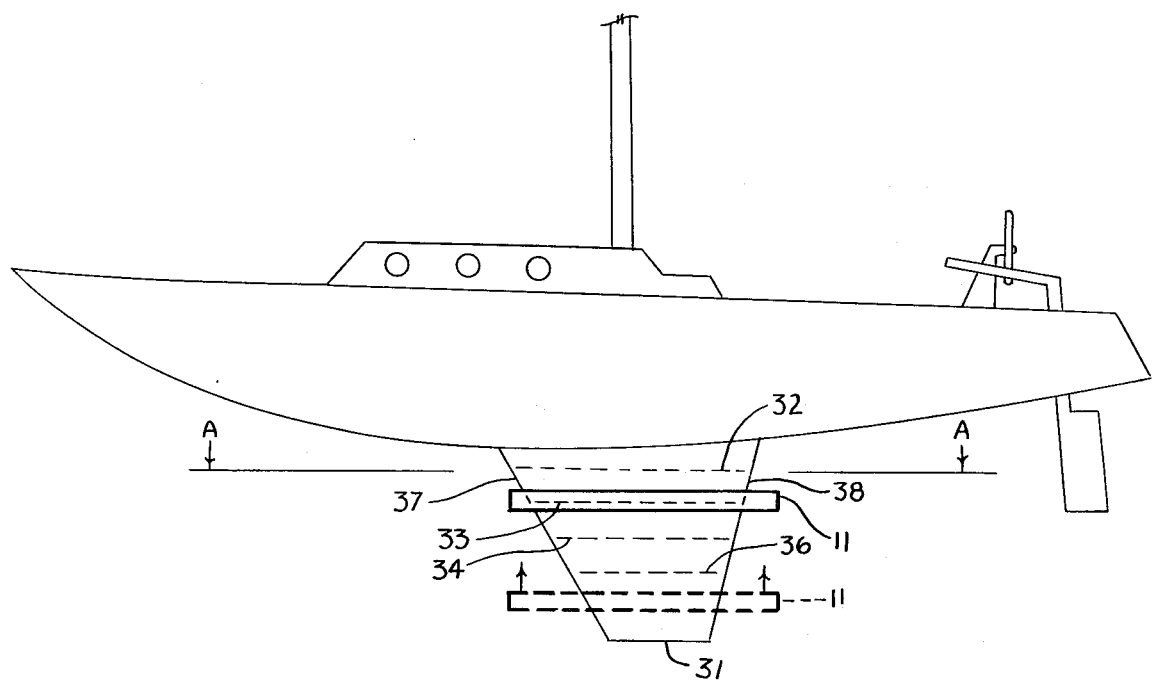
FIG. 1 is a side view of a boat showing application of the tool to the keel.

The above description assumes application to the tool 11 to only one side of the keel as depicted in FIGS. 1 and 2. The tool can now be flipped 180° and applied to the other side of the keel and therefore measure the keel on the reverse side. In this case curve 17 is being applied to the opposite side of the keel 31 at exactly the same position on the keel longitudinally. With the proper shaping of the keel on each side thereof by reference to curve 17 of the tool 11, it can be observed that the keel can be maintained and produced to have an exactly symmetrical shape by using tool 11.

After the keel is checked for symetry at each position 32, 33, 34 and 36, the surface of the keel between those positions can be contoured by addition or removal of material between those positions to produce a smooth, uniform surface over the entire keel.

Reference to FIG. 7 of the drawings will reveal an alternate embodiment of the tool 11 utilizing a flange 24 which incorporates a T-style flange 24. In this form of the invention, the sighting plane for the tool on either side of the keel will appear the same since flange 24 has extensions that extend beyond the top surface 26 and the bottom surface 27 of the flange so that when the tool is turned upside down and used on the opposite side of the keel, there will be a sighting surface which is exactly the same on each side.

There are many variations of the above-described invention which can be incorporated in the invention without departing from the principles thereof. Many of these variations will include a change of material as previously noted. A variety of sighting devices might be used in conjunction with the flange for aligning the center line of the boat and the longitudinal axes of the tool. Further, the exact same kind of tool and measuring principles can be applied to producing rudders having proper symmetry and alignment without departing from the above-described principles.

What is claimed is:

1. A tool for checking the alignment and shape of a boat keel lead edge, a trailing end and a flat planar, said tool having a body longer than the maximum distance between the leading and trailing edge of a boat keel and wider than the maximum thickness of such keel, said body having an elongated curved surface extending the length of the body from the lead end to the trailing end along the longitudinal axis of the tool, said elongated curved surface duplicating the curved shape of one side of a boat keel from the leading to the trailing edge of the keel, a lead extension on said body at the lead end corresponding with the lead edge of a boat keel and forming a symmetrical curved surface with the lead end of said elongated curve to duplicate the lead edge of a boat keel, a trailing extension on said body at the trailing end corresponding to the trailing edge of a boat keel and forming a symmetrical curved surface with the trailing end of said elongated curve to duplicate the trailing edge of a boat keel, and a flange connected to said body and extending from the lead end to the trailing end of said body and parallel to the longitudinal axis of said body, said flange functioning as a sight adapted to check the alignment of a boat keel with the center line of a boat with simultaneous application of the elongated curved surface to the surface of the keel to check the accuracy of the curve of the keel.

2. A tool for checking the alignment and shape of a boat keel lead edge, a trailing end and a flat planar, said tool having a body longer than the maximum distance between the leading and trailing edge of a boat keel and wider than the maximum thickness of such keel, said body having an elongated curved surface extending the length of the body from the lead end to the trailing end along the longitudinal axis of the tool, said elongated curved surface duplicating the curved shape of one side of a boat keel from the leading to the trailing edge of the keel, a lead extension on said body at the lead end corresponding with the lead edge of a boat keel and forming a symmetrical curved surface with the lead end of said elongated curve to duplicate the lead edge of a boat keel, a trailing extension on said body at the trailing end corresponding to the trailing edge of a boat keel and forming a symmetrical curved surface with the trailing end of said elongated curve to duplicate the trailing edge of a boat keel, and a flange connected to said body and extending from the lead end to the trailing end of said body and parallel to the longitudinal axis of said body, sight extensions mounted on each end of said flange, said flange and sight extensions functioning as a sight adapted to check the alignment of a boat keel with the center line of a boat with simultaneous application of the elongated curved surface to the surface of the keel to check the accuracy of the curve of the keel.

3. A tool for checking the alignment and shape of a boat keel lead end, a trailing end and a flat planar, said tool having a body longer than the maximum distance between the leading and trailing edge of a boat keel and wider than the maximum thickness of such keel, said body having an elongated curved survace extending the length of the body from the lead end to the trailing end along the longitudinal axis of the tool, said elongated curved surface duplicating the curved shape of one side of a boat keel from the leading to the trailing edge of the keel, a lead extension on said body at the lead end corresponding with the lead edge of a boat keel and forming a symmetrical curved surface with the lead end of said elongated curve to duplicate the lead edge of a boat keel, a trailing extension on said body at the trailing end corresponding to the trailing edge of a boat keel and forming a symmetrical curved surface with the trailing end of said elongated curve to duplicate the trailing edge of a boat keel, and a flange connected to said body and extending from the lead end to the trailing end of said body and parallel to the longitudinal axis of said body, said flange mounted perpendicular to the planor body to extend beyond the planor surfaces of said body and form a T-shaped cross section with said planor body, said flange functioning as a sight adapted to check the alignment of a boat keel with the center line of a boat with simultaneous application of the elongated curved surface of the keel to check the accuracy of the curve of the keel.

* * * * *